United States Patent
Deutschmann et al.

(10) Patent No.: US 10,630,718 B2
(45) Date of Patent: Apr. 21, 2020

(54) DETECTION OF REMOTE FRAUDULENT ACTIVITY IN A CLIENT-SERVER-SYSTEM

(71) Applicants: Ingo Deutschmann, Frankleben (DE); Per Burstrom, Lulea (SE); Philip Lindblad, Lulea (SE); David Julitz, Weissenfels (DE)

(72) Inventors: Ingo Deutschmann, Frankleben (DE); Per Burstrom, Lulea (SE); Philip Lindblad, Lulea (SE); David Julitz, Weissenfels (DE)

(73) Assignee: BEHAVIOSEC INC, San Francisco, CA (US)

( * ) Notice: Subject to any disclaimer, the term of this patent is extended or adjusted under 35 U.S.C. 154(b) by 0 days.

(21) Appl. No.: 16/200,740

(22) Filed: Nov. 27, 2018

(65) Prior Publication Data
US 2019/0124092 A1    Apr. 25, 2019

(51) Int. Cl.
*H04L 29/06* (2006.01)

(52) U.S. Cl.
CPC ........ *H04L 63/145* (2013.01); *H04L 63/0861* (2013.01); *H04L 63/1425* (2013.01); *H04L 63/083* (2013.01); *H04L 63/1466* (2013.01)

(58) Field of Classification Search
CPC . H04L 63/145; H04L 63/083; H04L 63/0861; H04L 63/1425; H04L 63/1466
See application file for complete search history.

(56) References Cited

U.S. PATENT DOCUMENTS

| | | | |
|---|---|---|---|
| 6,460,848 B1 | 10/2002 | Soltys et al. | |
| 7,003,561 B1 * | 2/2006 | Magdych | G06F 21/577 709/223 |
| 7,461,339 B2 * | 12/2008 | Liao | G06F 17/2264 715/234 |
| 8,789,193 B2 * | 7/2014 | Kelekar | H04L 63/1408 726/25 |
| 9,203,891 B2 * | 12/2015 | Bilange | H04L 67/02 |
| 10,476,873 B2 * | 11/2019 | Turgeman | H04L 63/0861 |
| 2010/0162399 A1 * | 6/2010 | Sheleheda | H04L 63/1416 726/24 |
| 2013/0091570 A1 * | 4/2013 | McCorkendale | G06F 21/56 726/23 |

(Continued)

OTHER PUBLICATIONS

Gordon Lyon The official Nmap project guide to network discovery and security scanning', excerpts from chapter 4, 2009, 14 pages—https://nmap.org/book/ (Year: 2009).*

(Continued)

*Primary Examiner* — Catherine Thiaw
(74) *Attorney, Agent, or Firm* — Michael J. Feigin, Esq.; Feigin and Fridman LLC

(57) ABSTRACT

Detecting unauthorized access to a device is detected in embodiments of the disclosed technology. After downloading a webpage, code is executed in a browser to scan network ports and determine which ports are open. Further webpage content sent from a web server is determined and/or modified in embodiments of the disclosed technology based on which ports are open. In some embodiments, when a particular port or ports are already in use it is determined that a malfeasant actor has access to the end user device and as such, sensitive data or secure data which is intended for a specific user is no longer sent to the end user device.

14 Claims, 4 Drawing Sheets

(56) References Cited

U.S. PATENT DOCUMENTS

| | | | | |
|---|---|---|---|---|
| 2013/0198848 A1* | 8/2013 | Wolff | .................... | G06F 21/568 |
| | | | | 726/25 |
| 2014/0283068 A1* | 9/2014 | Call | .................... | H04L 63/1425 |
| | | | | 726/23 |
| 2017/0012960 A1* | 1/2017 | Idika | ....................... | G06F 21/36 |
| 2017/0063923 A1* | 3/2017 | Yang | .................. | H04L 63/1483 |
| 2018/0255080 A1* | 9/2018 | Paine | ................. | H04L 63/1433 |

OTHER PUBLICATIONS

Bennieston 'Nmap—a stealth port scanner', , Nmap tutorial, 2004, 10 pages, retrieved from http://apachepersonal.miun.se/~janjon/oldcourse/dtab80/lab/lab1/Nmap_tutorial_2004-10-10.pdf (Year: 2004).*

Vivek 'How to check if port is in use on Linux or Unix', 2016, 8 pages, retrieved, retrieved from web.archive.org/web/20170325200857/https://www.cyberciti.biz/faq/unix-linux-check-if-port-is-in-use-command (Year: 2016).*

* cited by examiner

DETECTION OF REMOTE FRAUDULENT ACTIVITY IN A CLIENT-SERVER-SYSTEM

FIELD OF THE DISCLOSED TECHNOLOGY

The disclosed technology relates to a fraud management system and generally to fraud detection and, more specifically to initiating port scanning on an end user computer to detect fraudulent actors.

BACKGROUND OF THE DISCLOSED TECHNOLOGY

For as long as banks have been around, there has been fraud. Banks and other institutions that provide services that rely on authorized access must protect their clients from fraudulent actors. Given that breaking into a bank physically or electronically is typically more difficult than breaking into an individual user's computer, today's bank robbers often specialize in the "last mile" to the end customers. Many customers conduct their banking transactions via the internet using banking front ends, mostly running on their own devices such as desktop computers, tablets and smartphones.

In general, bank transactions in a digital environment are facilitated by the establishment of a session between server and client device using secure and encrypted communication protocols, which requires that the user supplies authorization credentials. This is most often based on a username and password and/or a second strong authentication, but it can also be based on biometric solutions such as fingerprint scan, iris scan or techniques using continuous behaviometrics in the background. A "user session" for purposes of this disclosure is defined as viewing and downloading of multiple discrete units of information, such as additional packetized data and/or webpages, being loaded on the basis of user input. Examples include a login page, an overview page, action pages, and so on. Each page may have multiple parts thereof such as fields, forms, lists, sliders and buttons for enabling user input.

Despite the efforts undertaken to make modern internet-based banking more secure, banking transactions are still vulnerable to the broad threat that modern fraud includes phishing, hacking, and stolen account information to crafty social engineering perfected to lure also quite avid and vigilant users of modern internet banking. In a social engineering fraud, it is often the proper user of the account that is lured to login and perform a transaction on a fraudulent front-end system.

In some cases, fraudulent actors use malware, remote access trojans (RATs) or automated programs (BOTs) to disguise their malfeasance. For purposes of this disclosure, use of a RAT, BOT, or other method of intercepting and/or using data which intended for another for a nefarious purpose or simulated nefarious purpose is referred to as "malfeasance" and a person or entity carrying out same is referred to as a "malfeasant" or "malfeasant party."

RAT attacks can be particularly difficult to detect and counteract because they are usually not found by traditional anti-virus and anti-malware products. They may lie dormant for long periods of time and collect privileged information to enable an attacker to log in using legitimate credentials, or to allow an attacker to access a session that was opened by the genuine user.

U.S. Pat. No. 6,460,848 describes a system which automatically monitors systems to detect fraud. This is carried out by using a number of clients networked over a computer network to a server and a central database which receives raw event data and other data and a graphical representation of contents of a bank. The end user CPU (central processing unit) executes play tracking and image analysis software for each client and can execute a software module for performing surveillance analysis and a software module for performing real-time data transmission. Additional computers can access the information in the central database to perform surveillance monitoring and reporting, respectively. The client communicates via an operations communications port and a diagnostics communication port with external computers and devices over a communications link such as a local area network and/or a wide area network. While some aspects of a casino's security system should be plainly visible as a deterrent, other aspects of the security should be unobtrusive to avoid detracting from the players' enjoyment of the game and to prevent cheaters and thieves from avoiding detection. The disadvantage of this system is that a proprietary program must be executed at each client computing device.

What is needed is a way to better detect malfeasance, fraud, and/or a risk of authenticated data sent to a banking user being compromised by a third party.

SUMMARY OF THE DISCLOSED TECHNOLOGY

A method for a fraud management system (defined as "a combination of devices used to detect fraud and prevent theft of data") to identify fraudulent behavior (defined as "actions carried out on a computer network via a plurality of network nodes to provide false information or receive information not intended for the receiving party") is disclosed herein. This includes instructions sent by a server (defined as "a device residing at a network node on a packet-switched network which distributes authenticated and/or encrypted data to a client receiving device at a different network node on the network intended to receive the data after authentication indicating that the client receiving device is authorized to receive the data"). The server distributes content via a packet-switched data network which has been encrypted to a client receiving device (defined as, "a device operated by a user who has been authenticated to receive secure/encrypted/authenticated data") at a separate network node on the network. The content includes code to be executed (such that instructions in the code are carried out) by the client receiving device to detect fraudulent behavior on the client receiving device. The results of the detection of fraudulent behavior are transmitted back to the server via the packet-switched network based on malfeasant behavior detected as a result of one or both of a remote access trojan (RAT) or automated software (BOT).

Described another way, behavioral analysis and port scanning to prevent data theft is carried out on an end user device based on instructions provided by the server with the downloading of authenticated data from the server to the end user device. Via a wireless or wired communication channel, a request for secure data is delivered via a first software port (e.g. port 81 or 8081 for a secure hypertext transmission protocol transmission (https)). A "software port" for purposes of this disclosure is defined as "a logical construct by which a specific process or network service executed on a computing device communicates with other devices on a packet-switched network." In embodiments of the disclosed technology, when a software network port is in use by a specific process or network service, other processes and network services are denied access to use the software port.

At least some secure data is sent via the communication channel to an end user device. This data includes code which is executed upon receipt thereof. Such execution of the code results in an attempt by the end user device to collect behavioral characteristics of the end user operating the device and to open a network connection via at least one other network port or multiple additional network ports other than the network port by which the code was received. This is due to the code having instructions to open a network connection via at least a second software port. Data is received sufficient to determine that the at least second software port is in use and as a result further delivery of data via the communication channel is modified such as by providing false information to catch a malfeasant actor, failing to provide further authenticated information, or the like.

In addition to scanning a second software port for the open or in use status thereof, a plurality of additional ports can be scanned by way of the code, when executed, attempting to open a network connection on each of the plurality of additional ports and modifying further delivery of data is based on a determination that any one of the plurality of additional ports being in use.

Additionally, in some embodiments the identity of a user carrying out the request for the secure data is determined. Additional requests from the authenticated user for further secure data can be made and as a result at least some additional said secure data via the communication channel is sent to the user. Each additional request can have code which upon execution by a device used by the user attempts to open a network connection on a plurality of additional software ports. These additional software ports are ports previously untried (attempted) to be opened for said particular user and/or within a particular authenticated session. An "authenticated session" is a combination of multiple requests for sending and/or receiving of data between a server and end user based on a single initial authenticated identity of the end user with the server. This can be via entry of a username/password, biometric data (iris or fingerprint scan), how the user uses the device such as how the user swipes a physical hardware device, and the like.

The software ports scanned, in embodiments of the disclosed technology, are those known to be used by remote access trojans (RAT) and/or malfeasant automated programs (BOT). The code is adapted to scan additional software ports and report availability of the additional software ports after a request for additional secure data is made in embodiments of the disclosed technology. Thus, at each request to download data, additional ports can be scanned. The number of ports, speed of scanning, and/or speed of reporting the results of the scans via the first software port can be throttled based on the available CPU (central processing unit) processing power (unused processor time) and/or the bandwidth of the end user device in order to prevent performance degradation. The additional ports can also be scanned after a period of time has passed without a request for additional data made to the server, where "additional time" is at least 15 seconds for purposes of this disclosure.

A "webpage" for purposes of this disclosure is "a discrete/finite amount of code received via a packet-switched data connection over a network node which has data sufficient to render text and graphics formatted to be viewed by a user" and can have additional data such as code which is executed to change the display or run tasks unknown to the viewer. In a method of delivering webpages to a device which will display the webpage, this is carried out with a request for user authentication. Once authenticated or during the above step code is embedded with the webpage causing a browser to scan a plurality of software ports. This involves attempting to open a new data network connection with another device on the network by way of addressing a software port. A "browser" for purposes of this disclosure is "a method or construct which renders code of a webpage and exhibits same to a user." Data sufficient to determine that a software port of the plurality of software ports is in use is generated and reported back to the server. The server then modifies content sent in further webpages based on a particular port being in use, such as based on a determination that a RAT or BOT is likely being or is on the end user computing device where the webpage was or is being rendered.

In some embodiments, a version of the code is executed upon or after download of content from each of a plurality of unique uniform resource locators (URL). A "URL" is defined as a string of text which is used to retrieve and/or identifies particular content to be sent/received via a data network.

Each time the code is executed, in some embodiments, different ports of the plurality of software ports are scanned. This is in order to use minimal CPU time on the end user device or remain undetected. Other mechanisms which can be used to minimize CPU or network bandwidth usage include scanning ports only after the content is fully rendered, adjusting scan speed or number of ports based on available bandwidth at the network node, and/or determining processor usage and throttling accordingly.

Described another way, a server delivers a) data sufficient for a remote device to render content designed for human viewing thereof; and b) code designed for execution by a remote device on a network, the code, when executed, causing scanning of network ports of the device where said content has been rendered. An indication is then received from the device where the content is rendered with an indication that a specific port of the network ports is already in use. Access is then denied to the remote device for at least some authenticated data due to the receiving of said indication.

The step of delivering is carried out multiple times to the device and each time the code is executed in embodiments of the disclosed technology. Each time different network ports are scanned than a previous time in some such embodiments.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

After downloading a webpage, code is executed in a browser to determine behavioral characteristics of a user of the browser and to scan network ports and determine which ports are open. Further webpage content sent from a web server is determined and/or modified in embodiments of the disclosed technology based on the behavioral characteristics and/or which ports are open. In some embodiments, when the behavioral characteristics discloses the use of a RAT or BOT software, the set of ports to scan is determined from prior knowledge of the specific type of RAT or BOT. In some embodiments, when a particular port or ports are already in use it is determined that a malfeasant actor has access to the end user device and as such, sensitive data or secure data which is intended for a specific user is no longer sent to the end user device. In some embodiments, the RAT or BOT behavioral characteristics are logged and stored by the behavioral module (to allow faster identification of such in future uses in some embodiments).

Embodiments of the disclosed technology will become more clear in view of the following description of the figures.

Figure 1:
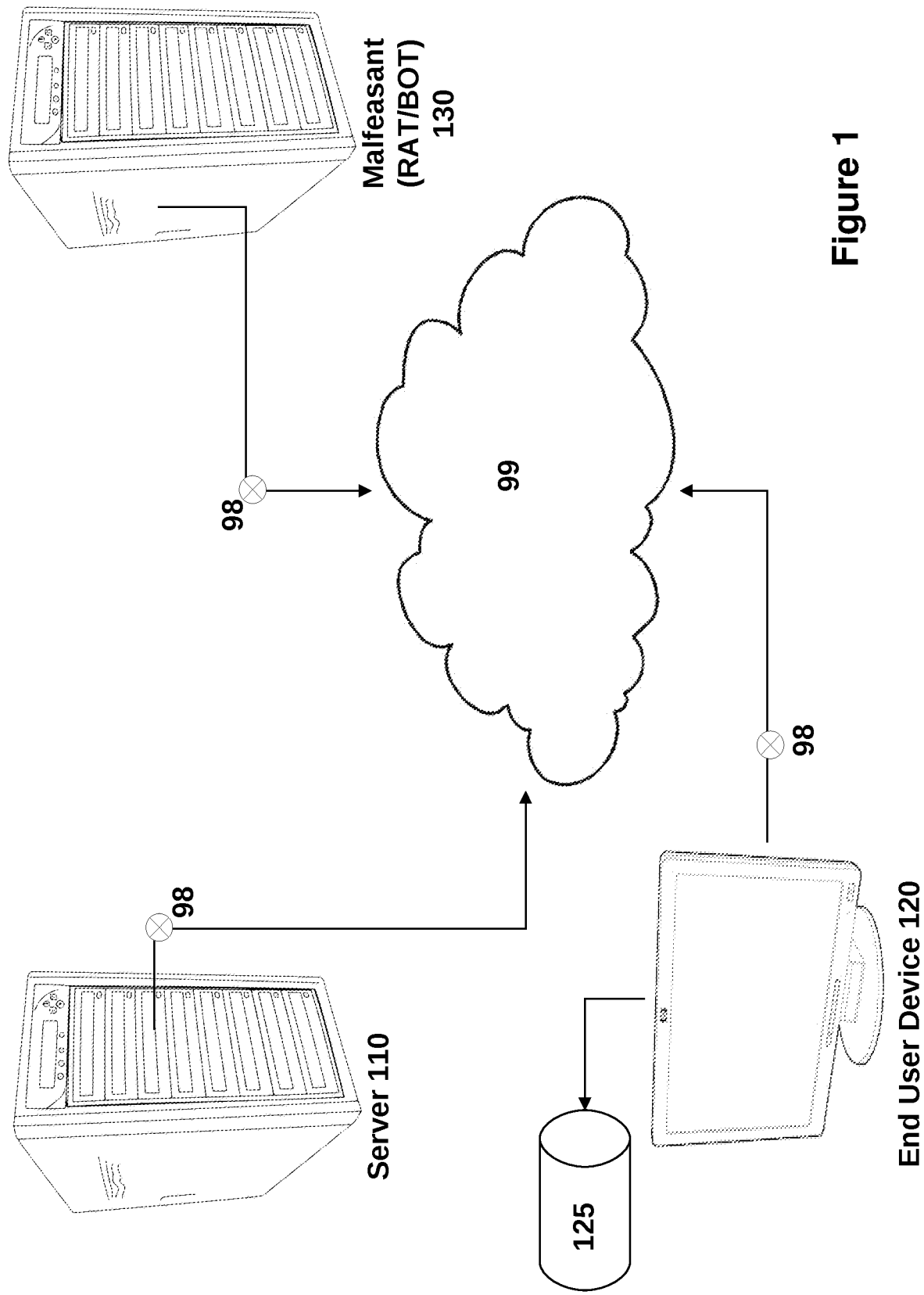
FIG. 1 shows a high level diagram of devices used to carry out embodiments of the disclosed technology.

FIG. 1 shows a high level diagram of devices used to carry out embodiments of the disclosed technology. Here, the server 110 sends content over a network 99 by way of a network node 98. The end user device 120 receives this content via a different network node 98 and stores content or retrieves previously stored content using a storage device 125. A malfeasant 130 is another computer device or device carrying out instructions of a malfeasant actor to at least partially gain control or data from the end user device 120. Each of these devices has the elements shown with reference to FIG. 4 and connects via a packet switched data network to at least one other of the devices. When the server 110 delivers content to the end user device 120, this can be secure content intended only for an authenticated user of the end user device 120. The end user device 120 carries out instructions that when executed, collects and characterizes the behavior of the authenticated user of the end user device 120. Such instructions are included in the content delivered by server 110 and represent methods that perform continuous authentication of the user during the session. The behavioral characteristics are defined as statistical measures of at least one or a plurality of key press times, key flight times, mouse movement, device description, user agent (meaning operating system, browser type, model, and version), screen refresh rate, pressure sensor readings and more. The devices 110 and 120 communicate via a particular software port (e.g. port 81 or 443). Via the communication, the behavioral characteristics are transferred from device 120 to server 110, in which the behavioral characteristics are matched to possible prior usage of the user's known behavior and checked for presence of known RAT and BOT signatures. Commonly, behavioral characterization is complex and a less than perfect match to a user behavioral profile or, in the case of malfeasance, a RAT or BOT profile, is achieved. In addition, the end user device 120 carries out further instructions received from the server 110 to scan ports other than the one or more already used for communicating to the server 110. Only one port can be used by one application at a time in a TCP/IP (transport control protocol internet protocol) stack. As such, if a port is currently in use, an attempt by the web browser to open or use the port will be denied. Based on the check for RAT/BOT signatures, the further instructions to scan other ports are comprised such that the port numbers to scan are chosen in an order that most relevantly represents the signatures of the detected RAT or BOT profiles, making for a much more effective selection of ports. Should the web browser receive a denial of opening a port other than the one used by the web browser or other application which receives content from the server 110 the server 110 then has the possibility to change what content is delivered. For example, should port 1111 be unavailable on the end user device 120, the end user device 120 reports this to the server 110 which then stops delivering secure data to the end user device 120 because this can be indicative of data being illicitly sent to a RAT/BOT 130 via the network 99.

Figure 2:
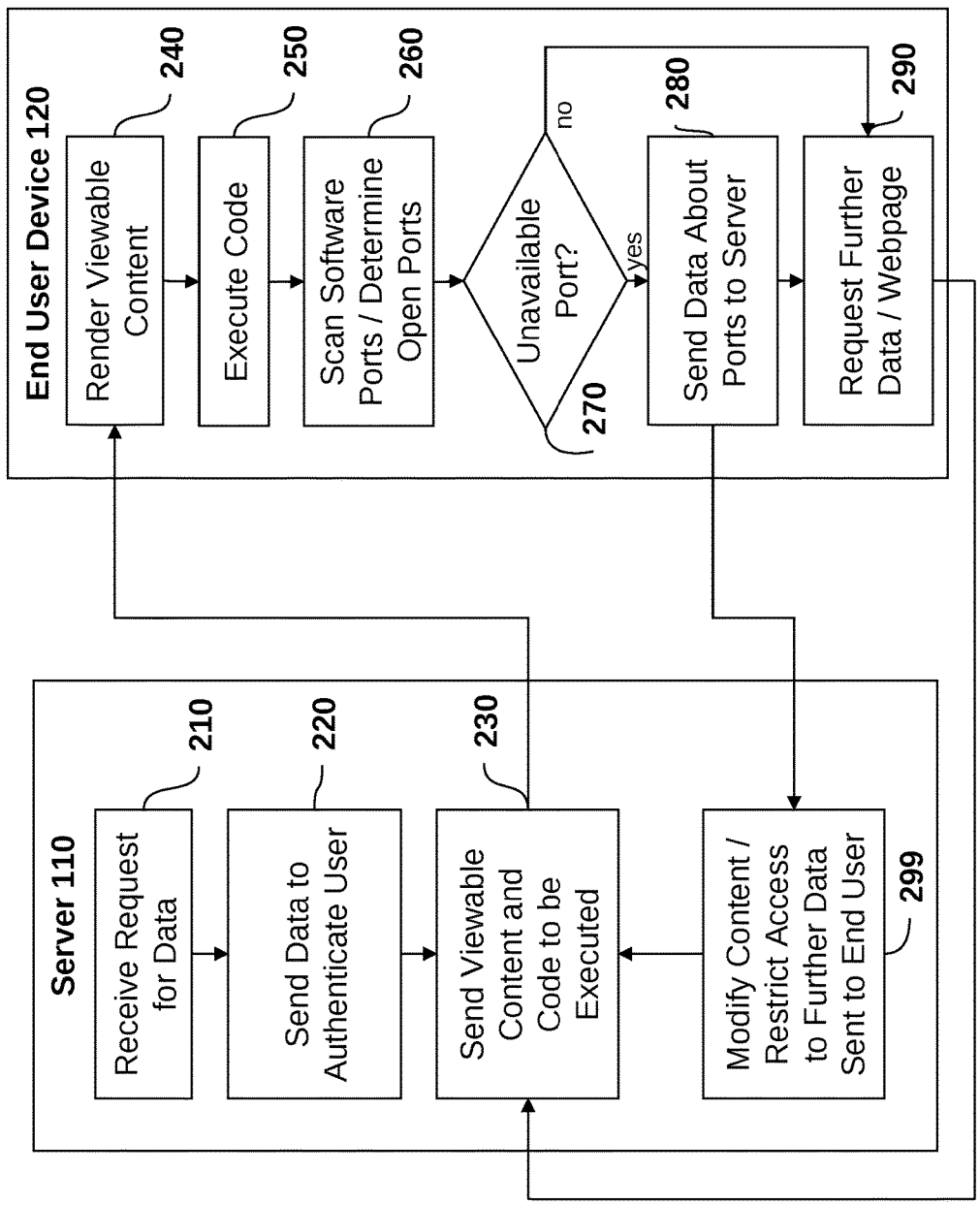
FIG. 2 shows a high level chart of steps carried out in an embodiment of the disclosed technology.

FIG. 2 shows a high level chart of steps carried out in an embodiment of the disclosed technology. The steps carried out by the server 110 are shown in the box on the left. The steps carried out by the end user device 120 are shown in the box on the right. In step 210 the server receives a request for data from the end user device 120. Data, in this embodiment, is sent to authenticate the user in step 220. This can be a request for a username and password, a request for biometric data (fingerprint or iris scan), etc. In step 230 viewable content and code to be executed are sent from the server 110 to the end user device 120. "Viewable content" is data which is rendered or sent with the intention that it be rendered into text and images by the end user device which is designed to be viewed by a human. "Code to be executed" is defined as data which is sent with the intention that instructions therewithin be carried out by end user device to, at least, attempt to collect behavioral biometrics data and open a network port on the end user device.

At this point, the end user device 120 carries out steps in embodiments of the disclosed technology, namely, rendering the viewable content in step 240 and executing code in step 250. The code causes the end user device 120 to collect behavioral characteristics of the user of end user device 120, and in step 260, scan software ports and determine which ports are open. The behavioral characteristics are sent to the server 110, which performs an analysis of the behavioral characteristics and based on this updates the code to be executed in step 230 again. The determination 270 of which ports are open can be based on being denied access to a port and while this step is shown as being carried out by the end user device 120, the actual determination or action which is based on the information gleaned by scanning the software ports can be carried out by the server. Referring still to FIG. 2, if a port is unavailable to be opened, as determined in step 270, then this information is sent to the server in step 280. The server will then device in step 299 if further content sent to the end user device 120 should be modified accordingly. This modification of further content sent can be in a manner which restricts access or further access to sensitive or private data about an individual or organization such as personal identifying information, bank account numbers, bank balances, and transaction history.

During the course of an authenticated session (a series of data exchanges between the server and end user device where a first authentication scheme, such as received username and password, is used to access secure data for a particular user determined to be operating the end user device) a plurality of webpages and other data may be sent in step 290. This continues or can continue with back and forth data requests and responses thereto in step 290 and then again in step 230. Content is only modified or restricted in step 299, in embodiments of the technology, when it is determined that a RAT or BOT is communicating or may be communicating with the end user device 120 due to either a RAT/BOT behavior signature being detected or a specific port being unavailable which is associated or used by a known RAT or BOT.

Referring again to FIG. 2, through multiple website views the code to be executed is sent in step 230 either one time per webpage download or one time while a webpage is dynamically updated. At each download of the webpage, each update of the webpage, or simply after a predefined passage of time (e.g. 1, 5, or 10 seconds) additional ports can be scanned in step 260. The ports scanned can be ports which have not previously been scanned in the authenticated session or for this end user 120, as known to the server 110. More detail about determining when and which ports to scan is described below with reference to FIG. 3.

Figure 3:
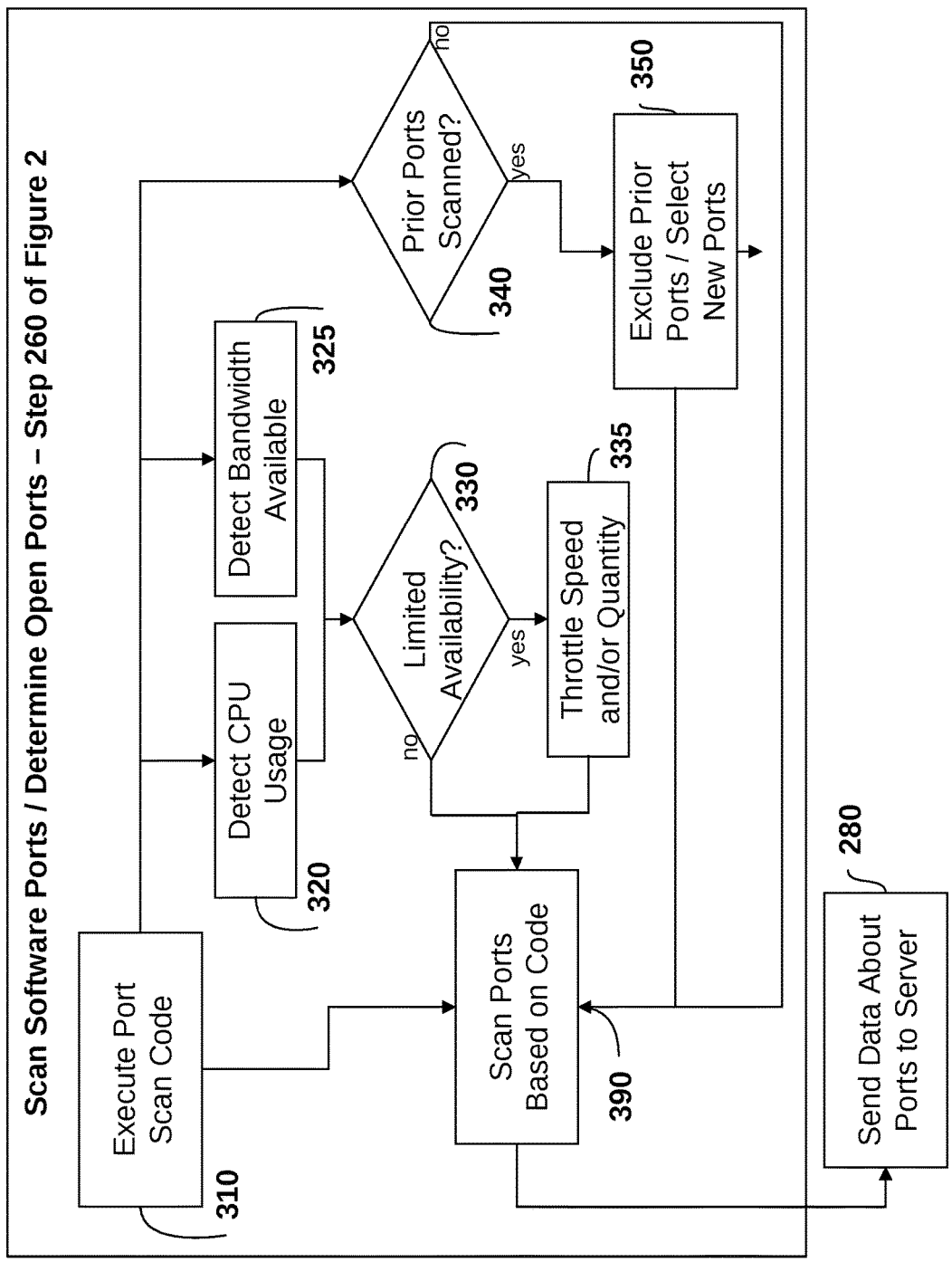
FIG. 3 shows a high level chart expounding on additional sub-routines and steps which are carried out in some methods of the disclosed technology.

FIG. 3 shows a high level chart expounding on additional sub-routines and steps which are carried out in some methods of the disclosed technology. Here, step 260 of FIG. 2 which refers to the scanning of software ports and determining open ports is elucidated in more detail with variations which take place in some embodiments of the disclosed technology. These steps are carried out by the end user device 120 in embodiments of the disclosed technology. In step 310 the code received from the server 110 along with a webpage with viewable content causes the end user computing device 120 to scan software ports. This can take place along with one or multiple of the pathways leading from box 310 which serve to vary how the scans are conducted. Since port scans are associated with a computational cost and network delay, it is unfeasible to do an exhaustive search and scan all ports in one go.

In step 320, the CPU (central processing unit) usage is determined for the end user device 120. In order to avoid degradation to the user experience and/or system performance of the end user computing device, in step 320 it is determined that if CPU usage is above a threshold that port scanning speed or quantity is throttled or reduced in step 335 due to a determination, in step 330, of limited CPU usage available. Likewise, if the available bandwidth in step 325 is determined to be limited in step 330, then the speed or quantity of ports scanned is throttled. In this case, bandwidth can refer to the maximum transfer speed between the server 110 and end user device 120, ping time, latency, or information known about the network on which the IP address of the end user device is situated. A cellular or satellite data connection, for example, may be given less ports to scan or ports per minute to scan than a wired fiber optic data connection to the end user.

In step 340 it is determined if ports have been previously scanned for the particular end user computing device 120 or scanned during a particular authenticated session. It might be decided, and programmed into the code which has instructions carried out by the end user device 120, to scan all 65535 ports in sequence, randomly, or based on most likely ports used by a RAT or BOT especially in view of a present known threat, as determined by the behavioral analysis, and common RAT or BOT used at the time. RATs commonly use port 80, 443, 8000, or 8080 which while typically also used for a web server, are ports that an end user computing device typically does not use. A Windows, Macintosh, or Linux machine used by an end user to access his/her bank, for example, probably is not running a web server. Therefore, if these ports are found to be unavailable than it may be indicative of a RAT or BOT running and action might be taken to restrict sending of sensitive data to such a machine. In step 50, prior ports scanned might be excluded from a future scan and/or new ports are selected to be scanned.

In any of the above cases, after it is determined which ports to scan and a speed at which to scan the ports, then the ports are scanned in a version of carrying out the coded instructions for same in step 390. The data about which ports are open for use or unavailable is then sent to the server in step 280 for processing and possibly restricting access to sensitive data, as described with reference to FIG. 2.

Describing the process of port scanning at a lower level, this can be carried out by a web browser by way of JavaScript in embodiments of the disclosed technology. This uses existing software. Some ways to implement port scanning mechanisms inside a browser are by injecting image elements into the DOM (document object model), by leveraging the XMLHttpRequest object or by leveraging WebSockets. The injection of new DOM elements works, because some DOM elements are triggering the browser to open connections and trying to download additional information. This will work for example for HTML <img> elements. The src attribute with some local address including some particular port of interest can be used for testing (i.e. https://127.0.0.1:8080). By JavaScript it is possible to hook into some event handling mechanisms for these particular elements. Listening to the events will reveal if the port is open or not. An example of code to carry out same follows.

```
function PortScannerImg( ) {
  this.timeout = 1000;
  this.run = function (ip, scan_list) {
    var self = this;
    scan_list.forEach(function (item, index) {
      var img = new Image( );
      var handler = function (e) {
        if (!img) return;
        img = undefined;
        item.state = 'open';
      };
      img.src = 'http://' + ip + ':' + item.port + '/'
        + Math.floor(Math.random( ) * 1000000) + '.png';
      img.onerror = handler;
      img.onload = handler;
      setTimeout(function ( ) {
        if (!img) return;
        img = undefined;
        item.state = 'closed';
      }, self.timeout);
    });
  }
}
{port: 21}, {port: 22}, {port: 25}, {port: 110},
{port: 8080}, {port: 8081}, {port: 8443},
{port: 3306}, {port: 3389}
];
var scannerImg = new PortScannerImg( );
scannerImg.run('127.0.0.1', scan_list);
```

Leveraging XMLHttpRequest is another way to carry out port scanning. In this case an AJAX Request is issued to the localhost IP address with some specific port of interest. Here again the different events can be handled with the aid of JavaScript to make the decision if a port is open or not.

```
function PortScannerXMLHttp( ) {
  this.run = function (ip, scan_list) {
    scan_list.forEach(function (item, index) {
      var xhttp= new XMLHttpRequest( );
      xhttp.onreadystatechange = function( ) {
        if (xhttp.readyState == 4) {
          if (!item.state)
            item.state = 'open';
        }
      };
      xhttp.open('GET', 'http://' + ip + ':' + item.port, true);
      xhttp.send( );
      setTimeout(function ( ) {
        if (!item.state)
          item.state = 'closed';
```

-continued

```
        }, 1000);
      });
    }
  }
  var scan_list2 = [
    {port: 21},{port: 22},{port: 25},{port: 110},
    {port: 8080},{port: 8081},{port: 8443},
    {port: 3306},{port: 3389}
  ];
  var scannerXMLHttp = new PortScannerXMLHttp( );
  scannerXMLHttp.run('127.0.0.1', scan_list2);
```

A third method to detect open ports is by way of Web-Sockets. In this case it is possible to track how much time is needed to change the readyState property. Depending on how long it takes to change the state one can conclude if a port is open or closed.

Figure 4:
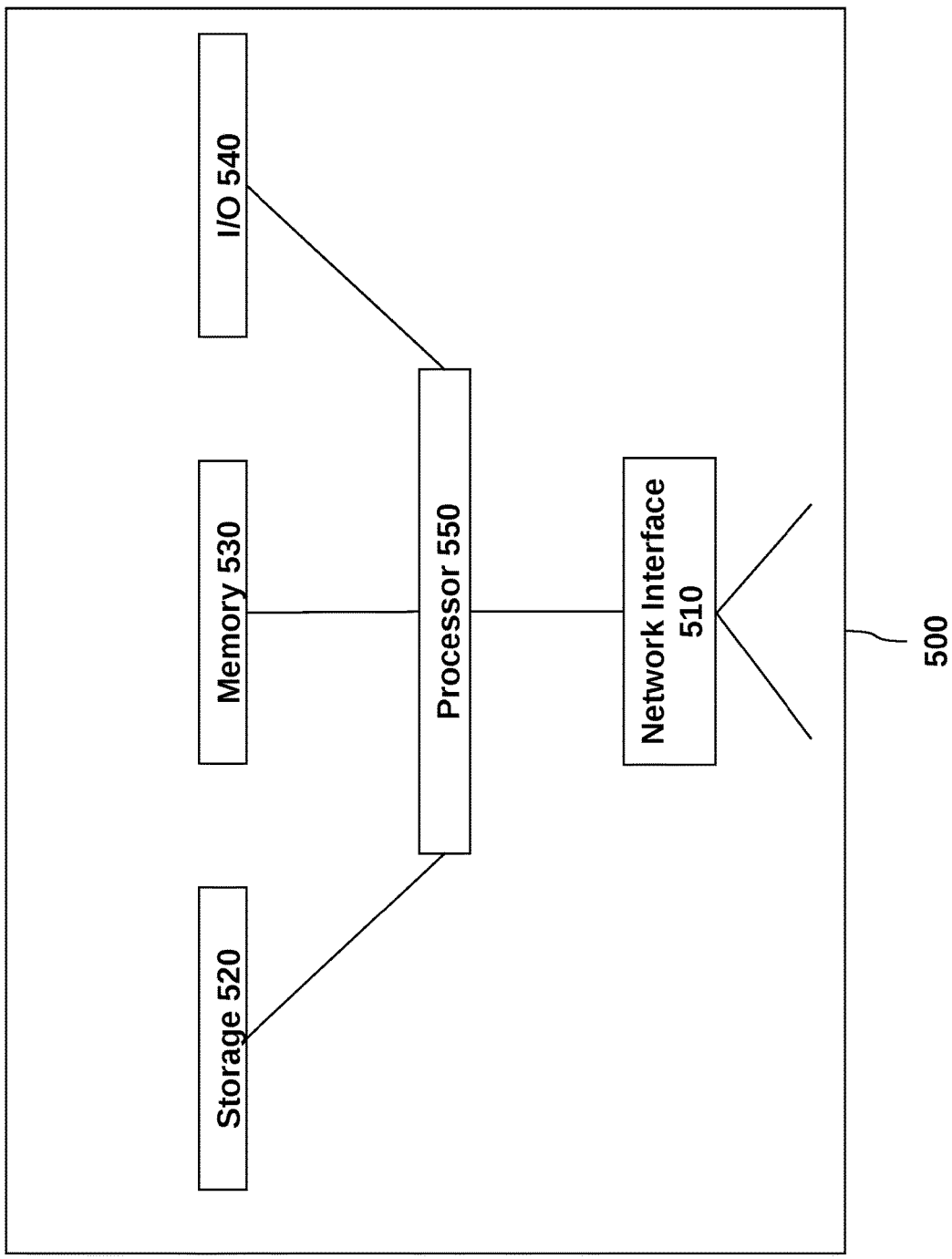
FIG. 4 shows a high level block diagram of devices used to carry out embodiments of the disclosed technology.

FIG. 4 shows a high level block diagram of devices used to carry out embodiments of the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions. A device 500 also includes one or a plurality of input network interfaces for communicating with other devices via a network (e.g., the internet). The device 500 further includes an electrical input interface. A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device for illustrative purposes. It should also be understood by one skilled in the art that the method and devices depicted in FIGS. 1 through 3 may be implemented on a device such as is shown in FIG. 4.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A method of port scanning to prevent data theft, comprising the steps of:
   receiving, from a user, via a wireless or wired communication channel, a request for secure data delivered via a first software port;
   sending at least some secure data via said wired or wireless communication channel, said at least some secure data including code which is executed upon receipt thereof, wherein said code attempts to open a network connection via a plurality of second software ports;
   receiving data based on which it is determined that said at least said second software port is in use;
   modifying further delivery of data via said wired or wireless communication channel as a result of said step of receiving data;
   wherein said code is adapted to scan at least one other software port, different from said second software port, and to report availability of said at least one other software port, after a ore defined period of time has passed from said receiving said request for secure data without a receiving another request for secure data;
   receiving additional requests from said user for further secure data;
   sending at least some additional secure data via said wired or wireless communication channel to said user wherein each additional sent secure data comprises additional code which upon execution by a device used by said user attempts to open a network connection on a plurality of additional software ports,
   wherein execution of said code causes an attempt to open a network connection on each of said plurality of second software ports, and wherein execution of said additional code causes an attempt to open a network connection on said plurality of additional software ports, which are different from said second software ports, and have not yet been tried for said particular user and/or within a particular authenticated session, such that at each request to download data, additional ports are scanned.

2. The method of claim 1, wherein said code, when executed, attempts to open a network connection on each of said plurality of second software ports and said modifying further delivery of data is carried out based on a determination that any one of said plurality of second software ports is in use.

3. The method of claim 2, comprising additional steps of: authenticating identity of the user carrying out said request for said secure data.

4. The method of claim 2, wherein said code is adapted to scan additional software ports and report availability of said additional software ports after a request for additional secure data is made.

5. The method of claim 1, wherein said second software port and said additional software ports are ports known to be used by remote access trojans (RAT) and/or malfeasant automated programs (BOT).

6. A method of delivering webpages comprising the steps of:
   responsive to a request from a user for secure data, delivering a webpage with a request for user authentication;
   authenticating said user and embedding code in a second webpage causing a browser to determine behavioral characteristics of said user and as a result of certain behavioral characteristics, scan a plurality of software ports, wherein said behavioral characteristics are statistical measures of at least one of a plurality of key press times, key flight times, mouse movement, and pressure sensor readings;
   receiving data based on which it is determined that a software port of said plurality of software ports is in use;

modifying content sent in further webpages based on a determination that said software port is in use;

receiving additional requests from said user for further secure data;

sending at least some additional secure data to said user wherein each additional sent secure data comprises additional code which upon execution by a device used by said user attempts to open a network connection on a plurality of additional software ports, wherein said code comprises instructions to attempt to open a network connection on each of a plurality of second software ports, and wherein said execution of said additional code causes an attempt to open a network connection on said plurality of additional software ports, which are different from said second software ports, and have not yet been tried for said particular user and/or within a particular authenticated session, such that at each request to download data, additional ports are scanned.

7. The method of claim 6, wherein a version of said code is executed upon or after download of content from each of a plurality of unique uniform resource locators (URLs).

8. The method of claim 7, wherein each time said code is executed after download of content from a unique URL, additional ports of said plurality of software ports are scanned.

9. The method of claim 8, wherein said scan takes place only after the entirety of said content is rendered.

10. The method of claim 8, wherein said modifying is based on a determination that said software port in said use is a port used by a malfeasant.

11. The method of claim 8, wherein a quantity and/or rate of said plurality of software ports being scanned is based on available network bandwidth of a network node and and/or processor usage where said software ports are being scanned.

12. A method, comprising the steps of:
delivering a combination of:
a) data based on which a remote device renders content designed for human viewing thereof; and
b) code designed for execution by a remote device on a network, wherein said code scans network ports of said device where said content has been rendered; receiving from said device an indication that a specific port of said network ports is already in use; and denying access to authenticated data due to said receiving of said indication;

wherein said step of delivering to said remote device is carried out a first time and a second time, wherein the code delivered in said second time, upon execution by said remote device used by said user attempts to open a network connection on a second subset of ports, wherein, in response to a first execution of said code following said delivering to said remote device said first time, a first subset of said network ports are scanned, and in response to a second execution of said code following said delivering to said remote device said second time, a second subset of said network ports are scanned, said second subset of said network ports being different from said first subset of said network ports wherein said second subset of ports have not yet been tried for a particular user and/or within a particular authenticated session, such that at each request to download data said additional ports are scanned.

13. The method of claim 12, wherein said code determines that said content has been rendered before said code scans network ports.

14. The method of claim 12, wherein said code designed for execution by said remote device on said network scans network ports at a rate based on one of available network bandwidth of said remote device and processor usage.

* * * * *